US012587829B2

(12) United States Patent

Chittoor et al.

(10) Patent No.: US 12,587,829 B2

(45) Date of Patent: Mar. 24, 2026

(54) TEMPORARY TRANSFER OF EMBEDDED SUBSCRIBER IDENTITY MODULE (eSIM) PROFILE

(71) Applicant: QUALCOMM Incorporated, San Diego, CA (US)

(72) Inventors: Sai Krishna Chittoor, Hyderabad (IN); Vijayakumar Reddy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/347,083

(22) Filed: Jul. 5, 2023

(65) Prior Publication Data

US 2025/0016546 A1     Jan. 9, 2025

(51) Int. Cl.
   *H04W 8/20*          (2009.01)

(52) U.S. Cl.
   CPC ................................... *H04W 8/205* (2013.01)

(58) Field of Classification Search
   CPC .................................................... H04W 8/205
   See application file for complete search history.

(56) References Cited

U.S. PATENT DOCUMENTS 10,187,784 B1 *   1/2019   Chen ...................... H04L 67/306
11,146,948 B1 *   10/2021   Uehling ................ H04W 12/30

| 2014/0073292 | A1 |   3/2014 | Kim et al. | |
| 2015/0237496 | A1 |   8/2015 | Gao et al. | |
| 2024/0147320 | A1 * |   5/2024 | Lang ................. | H04W 36/0072 |
| 2025/0016551 | A1 * |   1/2025 | Singh .................... | H04W 8/183 |
| 2025/0106617 | A1 * |   3/2025 | Singh .................... | H04W 8/183 |

FOREIGN PATENT DOCUMENTS

WO       2019042542 A1     3/2019

OTHER PUBLICATIONS

International Search Report and Written Opinion—PCT/US2024/026037—ISA/EPO—Aug. 16, 2024.

* cited by examiner

*Primary Examiner* — Barry W Taylor

(74) *Attorney, Agent, or Firm* — Patterson & Sheridan LLP

(57)              ABSTRACT

Certain aspects of the present disclosure generally relate to electronic devices and, more particularly, to techniques and apparatus for temporarily transferring subscriber identity module (SIM) profiles. One example method generally includes: receiving, from a first user equipment (UE), a request to obtain a SIM profile associated with a second UE, the first UE being different than the second UE; transmitting a first message including the SIM profile associated with the second UE in response to the request; and communicating with the first UE using the SIM profile.

30 Claims, 7 Drawing Sheets

400

Receive, from a first user equipment (UE), a
request to obtain a subscriber identity module
(SIM) profile associated with a second UE, the
first UE being different than the second UE 402

Transmit a first message including the SIM
profile associated with the second UE in
response to the request 404

Communicate with the first UE using the SIM
profile 406

500

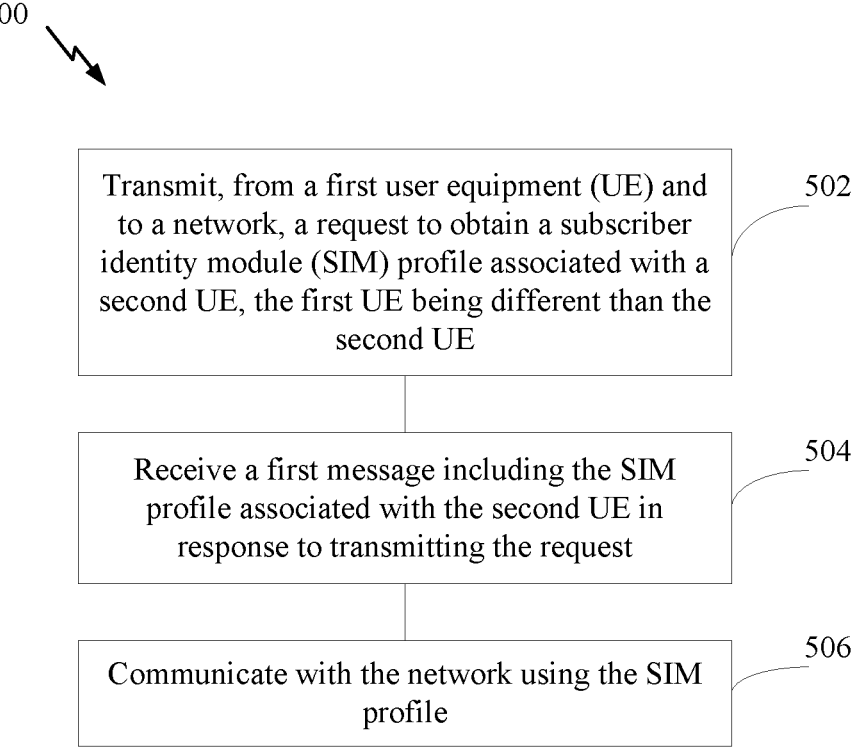

Transmit, from a first user equipment (UE) and to a network, a request to obtain a subscriber identity module (SIM) profile associated with a second UE, the first UE being different than the second UE                502

Receive a first message including the SIM profile associated with the second UE in response to transmitting the request                504

Communicate with the network using the SIM profile                506

TEMPORARY TRANSFER OF EMBEDDED SUBSCRIBER IDENTITY MODULE (eSIM) PROFILE

TECHNICAL FIELD

Certain aspects of the present disclosure generally relate to electronic devices and, more particularly, to techniques and apparatus for temporarily transferring embedded subscriber identity module (eSIM) profiles.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users. Wireless devices may include a subscriber identity module (SIM) card for storing a SIM profile. The SIM profile may include a set of parameters, including an international mobile subscriber identity (IMSI) and authentication key, that allows the wireless device to perform authentication and gain access to a cellular network. In some cases, an embedded subscriber identity module (eSIM) may be used. Unlike traditional SIM cards, an eSIM is integrated directly into the hardware of the wireless device.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide a method for wireless communication. The method generally includes: receiving, from a first user equipment (UE), a request to obtain a subscriber identity module (SIM) profile associated with a second UE, the first UE being different than the second UE; transmitting a first message including the SIM profile associated with the second UE in response to the request; and communicating with the first UE using the SIM profile.

Certain aspects of the present disclosure provide a method for wireless communication. The method generally includes: transmitting, from a first UE and to a network, a request to obtain a SIM profile associated with a second UE, the first UE being different than the second UE; receiving a first message including the SIM profile associated with the second UE in response to transmitting the request; and communicating with the network using the SIM profile.

Certain aspects of the present disclosure provide an apparatus for wireless communication. The apparatus generally includes a memory and one or more processors coupled to the memory and configured to: cause receiving, from a first UE, a request to obtain a SIM profile associated with a second UE, the first UE being different than the second UE; cause transmitting a first message including the SIM profile associated with the second UE in response to the request; and cause communicating with the first UE using the SIM profile.

Certain aspects of the present disclosure provide an apparatus for wireless communication at a first UE. The apparatus generally includes a memory and one or more processors coupled to the memory and configured to: cause transmitting, to a network, a request to obtain a SIM profile associated with a second UE, the first UE being different than the second UE; cause receiving a first message including the SIM profile associated with the second UE in response to transmitting the request; and cause communicating with the network using the SIM profile.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication at a user equipment (UE), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
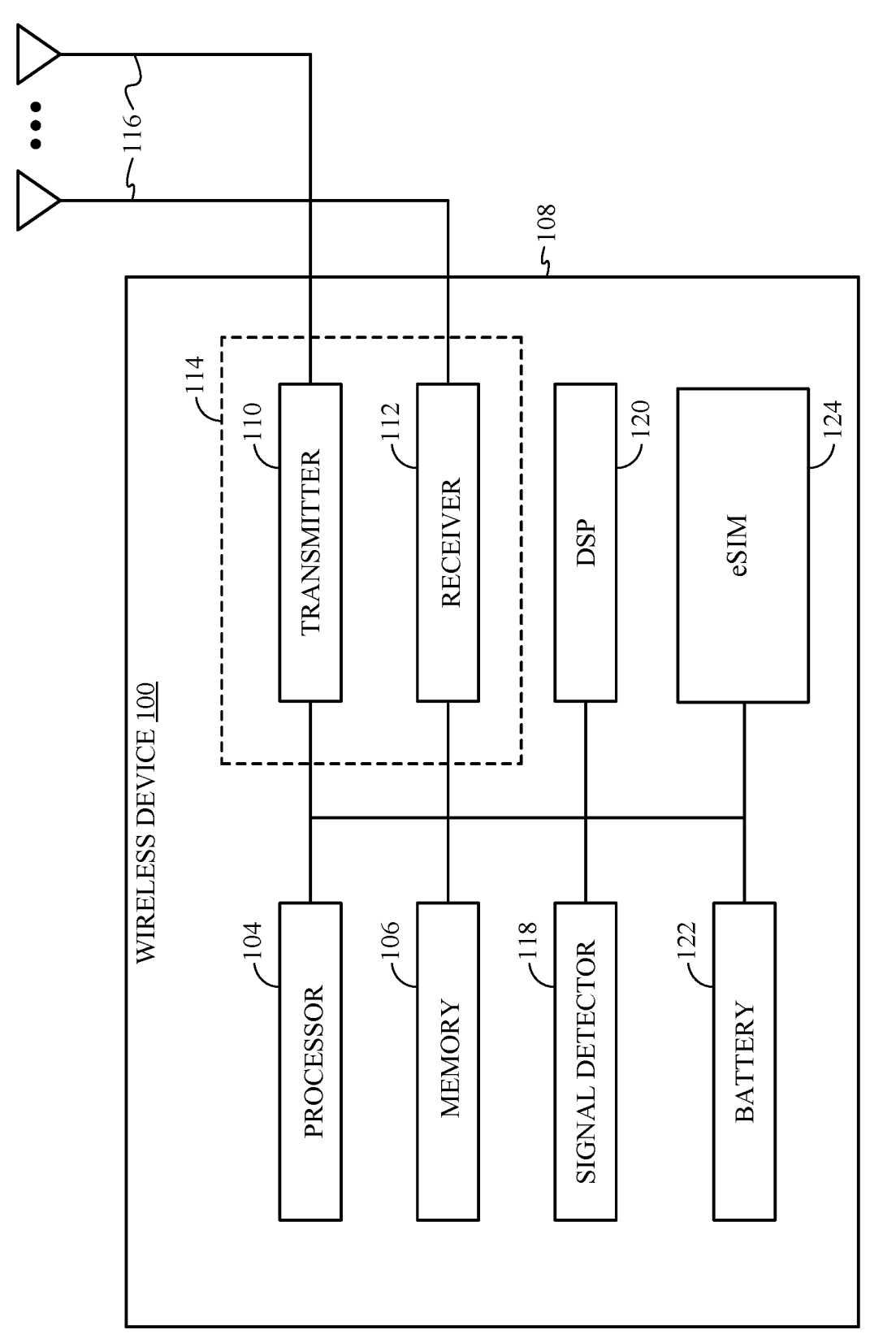
FIG. 1 is a block diagram of an example wireless device, in which aspects of the present disclosure may be practiced.

Certain aspects of the present disclosure provide techniques and apparatus for temporarily transferring an embedded subscriber identity module (eSIM) profile to a user equipment (UE). As described in more detail herein, an eSIM may be soldered permanently in a first UE and when the first UE is turned off (e.g., due to a drained battery), the eSIM profile cannot be transferred to a second UE to use the associated services. Thus, the user cannot use the subscribed carrier/operator's services (e.g., voice and data transmission) associated with the eSIM profile unless the first UE is switched back on. In some aspects of the present disclosure, when the first UE having the eSIM is tuned off, a second UE may be used to download the associated eSIM profile and temporarily use the services associated with the eSIM profile on the second UE. In some aspects, the eSIM profile downloaded on the second UE may be deleted upon the expiration of a timer. In some aspects, the eSIM profile on the second UE may be deleted upon the first UE being turned back on, and the services associated with the eSIM may be resumed on the first UE.

Various aspects of the disclosure are described more fully hereinafter with reference to the accompanying drawings. This disclosure may, however, be embodied in many differ-ent forms and should not be construed as limited to any specific structure or function presented throughout this dis-closure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, function-ality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected ther-ebetween).

An Example Device

It should be understood that aspects of the present dis-closure may be used in a variety of applications. Although the present disclosure is not limited in this respect, the circuits disclosed herein may be used in any of various suitable apparatus, such as in the power supply, battery charging circuit, or power management circuit of a commu-nication system, a video codec, audio equipment such as music players and microphones, a television, camera equip-ment, and test equipment such as an oscilloscope. Commu-nication systems intended to be included within the scope of the present disclosure include, by way of example only, cellular radiotelephone communication systems, satellite communication systems, two-way radio communication systems, one-way pagers, two-way pagers, personal com-munication systems (PCSs), personal digital assistants (PDAs), Internet of Things (IoT) devices, and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an IoT device, a wearable device, an augmented reality device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a transmitter 110 and/or a receiver 112 to allow transmission and/or reception, respectively, of data between the device 100 and a remote location. In some cases, the transmitter 110 and receiver 112 may be combined into a transceiver 114. One or more antennas 116 may be attached or otherwise coupled to a housing 108 of the device 100 and electrically coupled to the transceiver 114. For certain aspects, the device 100 may include multiple transmitters, multiple receivers, and/or multiple transceivers (not shown).

The device 100 may also include a signal detector 118 that may be used in an effort to detect and quantify the level of signals received by the transceiver 114 (or the receiver 112). The signal detector 118 may detect such signal parameters as total energy, energy per subcarrier per symbol, and power spectral density, among others. The device 100 may also include a digital signal processor (DSP) 120 for use in processing digital signals. The device 100 may further include a battery 122, which may be used to power the various components of the device 100.

The device 100 may also include an embedded subscriber identity module (eSIM) 124. The eSIM 124 may store a SIM profile allowing access to a cellular network. In some aspects, the SIM profile may be temporarily transferred to another wireless device, as described in more detail herein.

Example Techniques for Transfer of eSIM Profiles

If a user equipment (UE) has a removable subscriber identity module (SIM) card and the UE is switched off (e.g., due to running out of battery charge), then the SIM card can be removed from the UE and inserted into another UE, allowing the user to use voice and data transmission services on the other UE. However, with a UE having an embedded SIM (eSIM), if the UE is switched off, then the eSIM cannot be removed because the eSIM is soldered permanently in the UE.

In certain aspects, once a user's UE is turned off, the user may temporarily transfer the associated SIM profile to another UE, allowing the user to access voice and data services on the other UE temporarily. In some aspects, the eSIM profile may remain on the other UE for a temporary duration. For example, the eSIM profile may be deleted from the other UE upon the expiration of a timer or upon the UE being turned back on.

Figure 2:
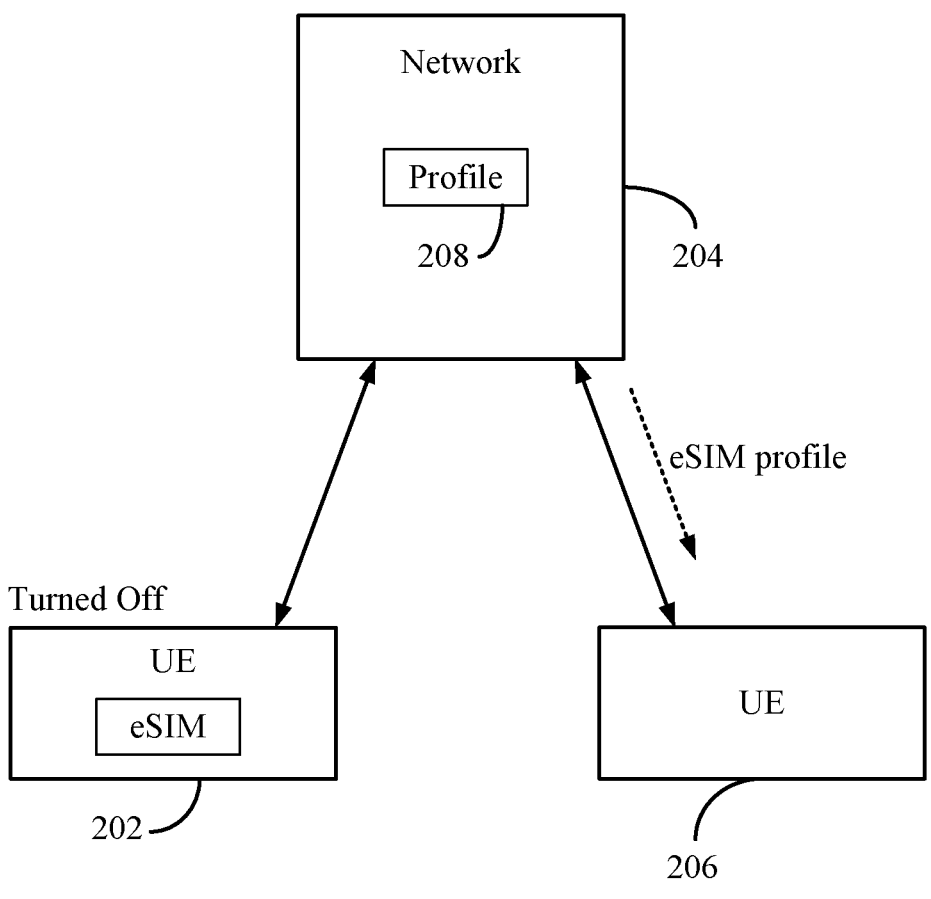
FIG. 2 illustrates example techniques for temporary transfer of an embedded subscriber identity module (eSIM) profile, in accordance with certain aspects of the present disclosure.

FIG. 2 illustrates example techniques for temporary trans-fer of an eSIM profile, in accordance with certain aspects of the present disclosure. As shown, the UE 202 may include an eSIM (e.g., the eSIM 124). In a scenario, the UE 202 may have a battery charge that is depleted and may turn off. The user may want to use voice or data services based on the eSIM profile of the UE 202, but using another UE 206. For example, the user may want to call a relative using contact information that is part of the eSIM profile. In this case, since the eSIM is embedded in the UE 202, the user would have to wait until the UE 202 recharges and can be turned on to make the phone call.

The eSIM profile may include a variety of information such as the user's phone number (e.g., associated with the UE 202), contacts, and/or text messages. The eSIM profile may also include information to identify the user to an operator or carrier network 204, such as a SIM number or an authentication key used to access the network.

In some aspects of the present disclosure, when the UE 202 is switched off, the user may use the UE 206 to access the operator or carrier network 204 to download an eSIM profile 208 stored on the network 204 onto the UE 206, giving the user access to voice and data services on the UE 206. In some cases, the eSIM profile 208 may include contact information previously saved by the user on the eSIM. The contact information may be downloaded to the UE 206, allowing the user to contact, for example, a relative using the contact information.

To download the eSIM profile, the user may enter, into the UE 206, the mobile number associated with the eSIM profile (e.g., the mobile number associated with the UE 202 having a profile carrier enabled). On the UE 206, the user may access a cellular network options menu, enter the mobile number, and download the profile. For instance, under cellular network options, the user may disable any currently active profile of the UE 206. The user may then select an option to reuse the carrier/operator active profile from the other eSIM phone (e.g., the UE 202). The user may then enter the mobile number associated with the eSIM profile of the UE 202. The operator or carrier network 204 may verify that the primary eSIM phone (the UE 202) has been switched off. For example, the network 204 may attempt communication with the UE 202, and if no response is received, it may be assumed that the UE 202 is off.

In some aspects, prior to sending the eSIM profile to the UE 206, the network 204 may perform an authentication process with the primary user of the UE 202. Any suitable authentication process may be used. For example, the network 204 may send a code (e.g., via email) to the user. The user may obtain the code (e.g., by logging into an email server). The code may be entered into a field on a display of the UE 206, initiating the download from the network 204 of the eSIM profile on the UE 206. The user may then access the eSIM profile and use voice and/or data services available to the eSIM profile.

In some aspects, the eSIM profile may remain active on the UE 206 for a certain period of time. For example, the eSIM profile may remain active on the UE 206 for 20 minutes. The active duration of the eSIM profile may be preconfigured by the operator or may be user configurable. For example, the user may indicate or request to the operator to set the active duration to 20 minutes, which may be saved on the network 204. After the active duration has expired, the eSIM profile may be deleted from the UE 206. For example, the network 204 may send a signal to the UE 206, causing the eSIM profile to be deactivated or deleted from the UE 206. In some aspects, a deactivation timer may be implemented at the UE 206, which when expired, results in the deletion or deactivation of the eSIM profile on the UE 206.

In some aspects, the eSIM profile on the UE 206 may be deleted or deactivated based on the UE 202 being powered on. For example, the network may receive a communication from the UE 202, indicating that the UE 202 has been turned back on. In response, the network 204 may send a signal to the UE 206 to deactivate or delete the eSIM profile. Certain aspects of the present disclosure allow users to access voice and/or data services (and saved contact information), which may be used in case of an emergency where the user is unable to wait until the user's primary phone is turned back on.

Figure 3:
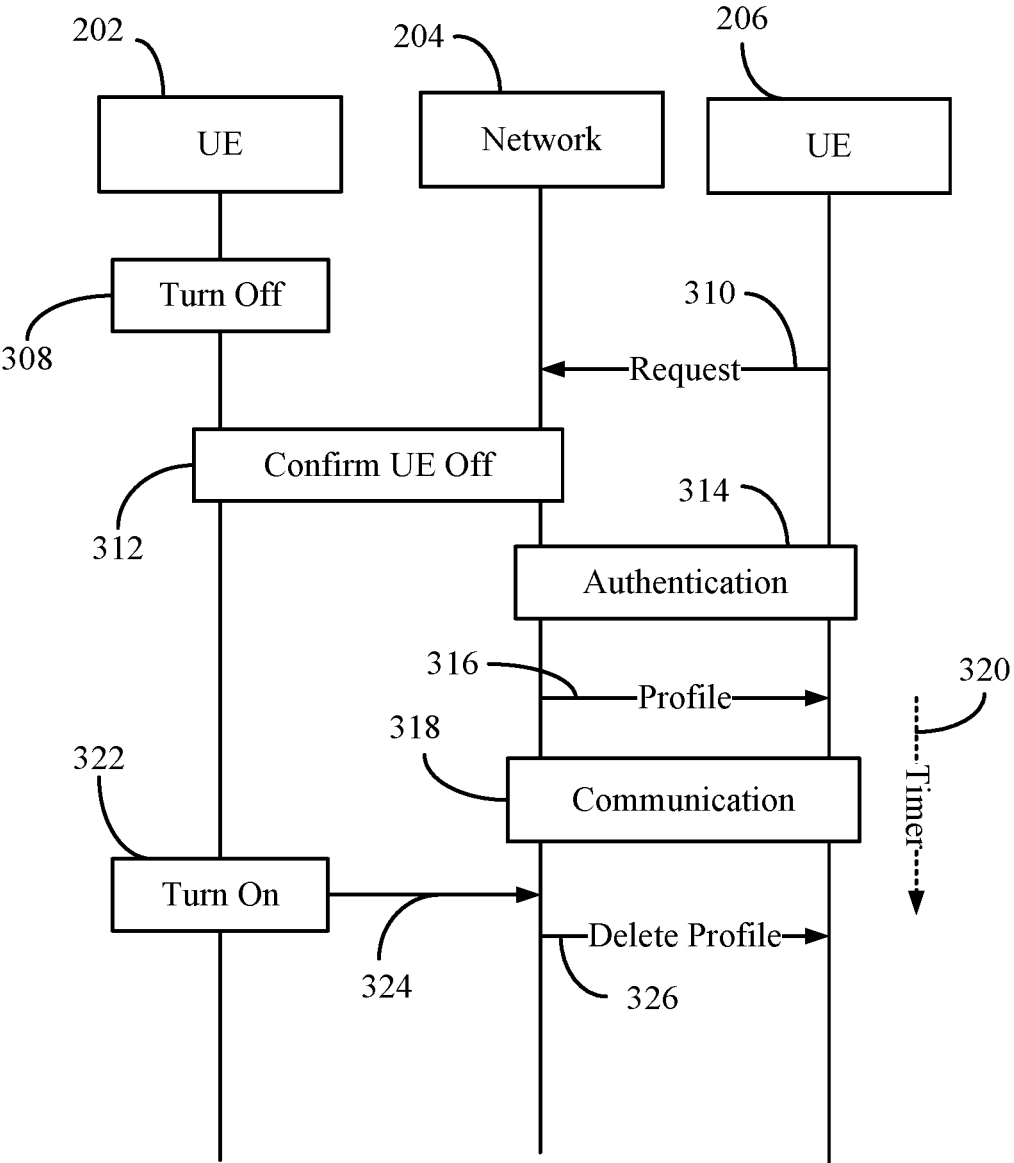
FIG. 3 is a timing diagram illustrating example operations for transferring an eSIM profile, in accordance with certain aspects of the present disclosure.

FIG. 3 is a timing diagram illustrating example operations for transferring an eSIM profile, in accordance with certain aspects of the present disclosure. As shown, at block 308, the UE 202 may be turned off (or otherwise inoperable or unavailable). A user may send a request 310, via the UE 206, for the transfer of an eSIM profile associated with the UE 202. In response to receiving the request 310, the network 204 may confirm that the UE 202 is turned off at block 312. At block 314, the network 204 may perform an authentication process, as described herein. For example, the network may send an authentication code to the user via email. The user may be prompted on the UE 206 to enter the authentication code. Upon entering the authentication code, the code may be sent to the network 204 and matched with the code sent to the user via email. If authentication is successful, a message 316 having the eSIM profile may be sent to the UE 206, allowing for communication 318 based on the eSIM profile. In some aspects, a timer 320 may begin when the eSIM profile is sent to UE 206. Upon expiration of the timer, the network 204 may send a message 326 to the UE 206 to delete the eSIM profile, or the UE 206 may automatically delete or deactivate the eSIM profile, as described herein. In some aspects, the message 326 may be sent in response to the UE 202 being turned on at block 322. For example, once the UE 202 turns on, a signal 324 may be sent to the network 204, based on which the network 204 may determine that the UE 202 has turned back on and sends the message 326 in response.

Figure 4:
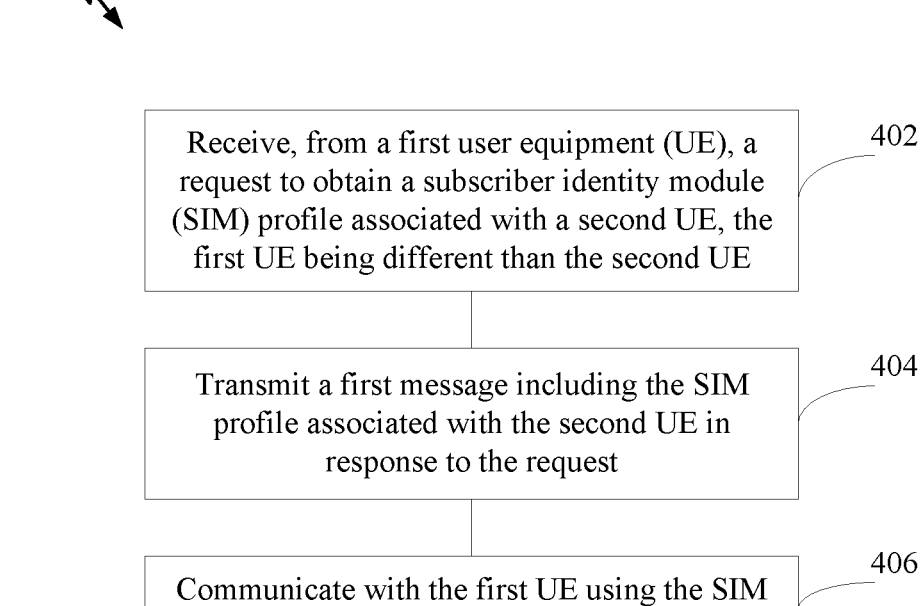
FIG. 4 is a flow diagram illustrating example operations for wireless communication at a network, in accordance with certain aspects of the present disclosure.

FIG. 4 is a flow diagram illustrating example operations 400 for wireless communication, in accordance with certain aspects of the present disclosure. The operations 400 may be performed, for example, by a network entity, such as the network 204.

At block 402, the network entity may receive, from a first UE (e.g., the UE 206), a request (e.g., the request 310 of FIG. 3) to obtain a SIM profile (e.g., the eSIM profile 208) associated with a second UE (e.g., the UE 202). At block 404, the network entity may transmit a first message (e.g., the message 316 of FIG. 3) including the SIM profile associated with the second UE in response to the request. At block 406, the network entity may communicate with the first UE using the SIM profile.

In some aspects, the network entity may authenticate (e.g., at block 314 of FIG. 3) whether a user associated with the SIM profile has sent the request via the first UE, where the first message including the SIM profile is transmitted based on the authentication. For example, the authenticating may include sending a first code to the user (e.g., via email), receiving a second code from the first UE after sending the first code, and determining whether the second code matches the first code.

In some aspects, the network entity may send a second message (e.g., the message 326 of FIG. 3) configured to delete the SIM profile from the first UE, after expiration of a timer (e.g., the timer 320), in some cases. In some aspects, the network entity may determine whether the second UE is turned off in response to receiving the request. The first message including the SIM profile may be transmitted based on the second UE being turned off. In some aspects, the network entity may determine that the second UE has been turned back on and transmit a second message (e.g., the message 326 of FIG. 3) configured to delete the SIM profile from the first UE based on the second UE being turned back on.

FIG. 5 is a flow diagram illustrating example operations 500 for wireless communication, in accordance with certain aspects of the present disclosure. The operations 500 may be performed, for example, by a first UE, such as the UE 206.

At block 502, the first UE may transmit (e.g., to the network 204) a request (e.g., the request 310) to obtain a SIM profile (e.g., eSIM profile) associated with a second UE (e.g., the UE 202). At block 504, the first UE may receive a first message (e.g., the message 316) including the SIM profile associated with the second UE in response to transmitting the request. At block 506, the first UE may communicate with the network using the SIM profile.

In some aspects, the first UE may receive a phone number associated with the SIM profile, where the request is transmitted based on the phone number. In some aspects, the first UE may receive (e.g., as part of the authentication performed at block 314) an authentication code from a user and transmit the authentication code to the network, where the first message including the SIM profile is received based on the authentication code. In some aspects, the first UE may delete the SIM profile from the first UE after expiration of a timer (e.g., the timer 320). In certain aspects, the first UE may receive a second message (e.g., the message 326) indicating to delete the SIM profile and may delete the SIM profile in response to receiving the second message. In some aspects, the first UE may deactivate another SIM profile associated with the first UE prior to communicating using the SIM profile.

Example Communications Device(s)

Figure 6:
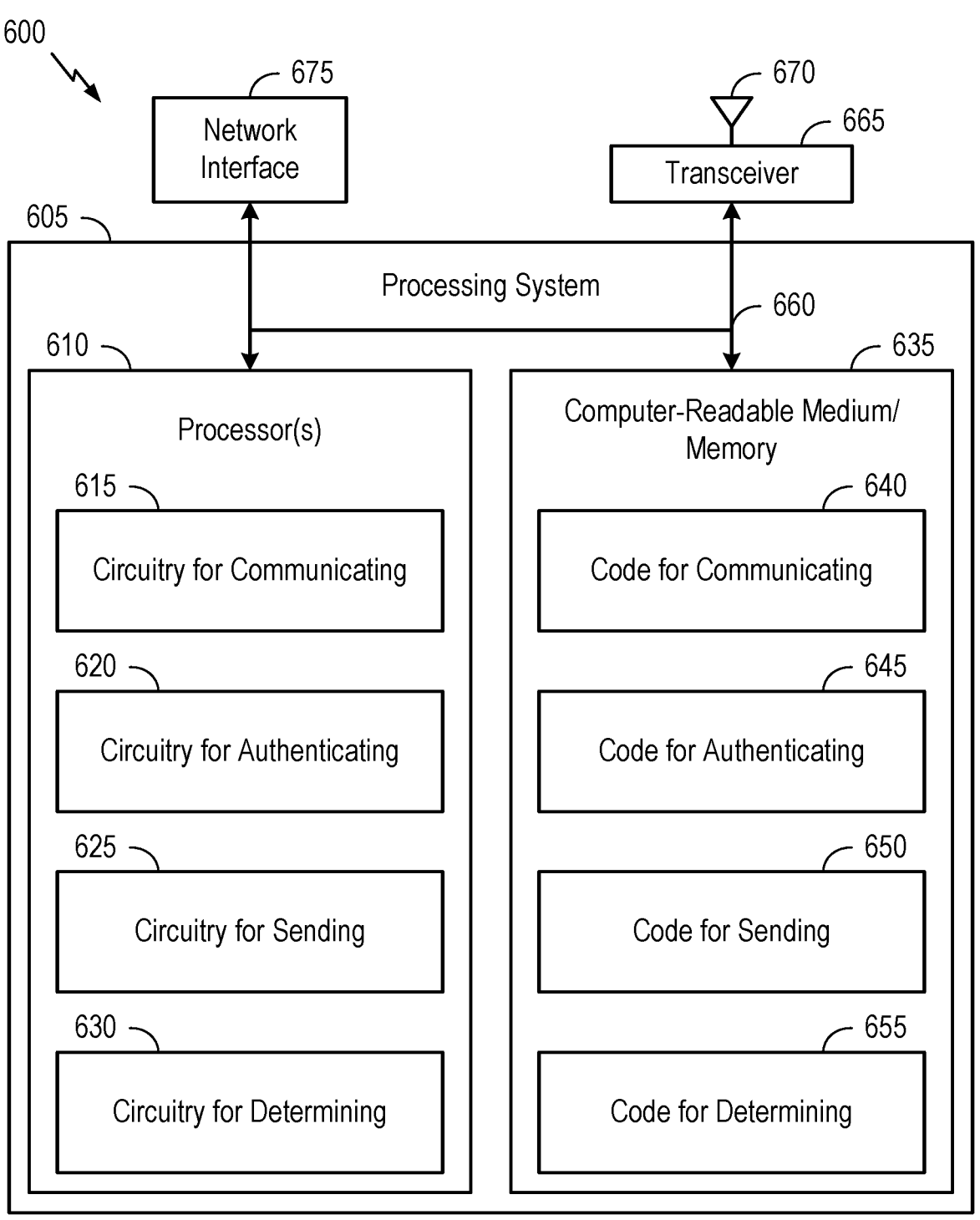
FIGS. 6 and 7 depict aspects of example communications devices.

FIG. 6 depicts aspects of an example communications device 600. In some aspects, the communications device 600 is a network entity, such as the network 204.

The communications device 600 includes a processing system 605 coupled to a transceiver 665 (e.g., a transmitter and/or a receiver) and/or a network interface 675. The transceiver 665 is configured to transmit and receive signals for the communications device 600, such as the various signals as described herein, via an antenna 670. The network interface 675 is configured to obtain and send signals for the communications device 600 via communication link(s), such as a backhaul link, midhaul link, and/or fronthaul link. The processing system 605 may be configured to perform processing functions for the communications device 600, including processing signals received and/or to be transmitted by the communications device 600.

The processing system 605 includes one or more processors 610. The one or more processors 610 are coupled to a computer-readable medium/memory 635 via a bus 660. In certain aspects, the computer-readable medium/memory 635 is configured to store instructions (e.g., computer-executable code) that when executed by the one or more processors 610, cause the one or more processors 610 to perform the operations 400 described with respect to FIG. 4, or any aspect related thereto. Note that reference to a processor of communications device 600 performing a function may include one or more processors 610 of communications device 600 performing that function.

In the depicted example, the computer-readable medium/memory 635 stores code (e.g., executable instructions), such as code for communicating 640 (e.g., code for transmitting and/or receiving), code for authenticating 645, the code for sending 650, and code for determining 655. Processing of the code for communicating 640 (e.g., code for transmitting and/or receiving), the code for authenticating 645, the code for sending 650, and the code for determining 655 may cause the communications device 600 to perform the operations 400 described with respect to FIG. 4, or any aspect related thereto.

The one or more processors 610 include circuitry configured to implement (e.g., execute) the code stored in the computer-readable medium/memory 635, including circuitry such as circuitry for communicating 615, circuitry for authenticating 620, circuitry for sending 625, and circuitry for determining 630. Processing with the circuitry for communicating 615, the circuitry for authenticating 620, the circuitry for sending 625, and the circuitry for determining 630 may cause the communications device 600 to perform the operations 400 described with respect to FIG. 4, or any aspect related thereto. Various components of the communications device 600 may provide means for performing the operations 400 described with respect to FIG. 4, or any aspect related thereto.

Figure 7:
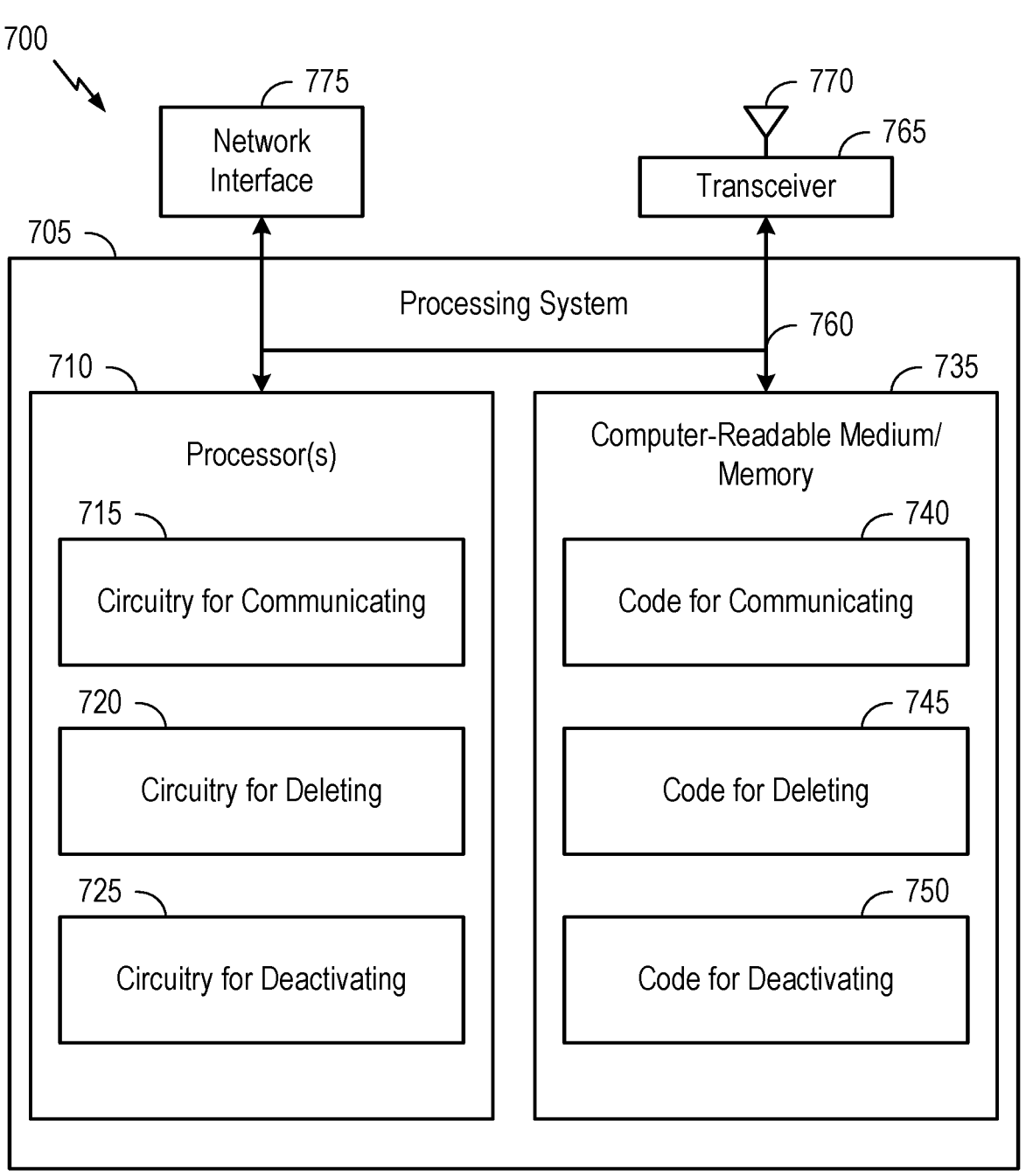

FIG. 7 depicts aspects of an example communications device 700. In some aspects, the communications device 700 is a UE, such as the UE 206.

The communications device 700 includes a processing system 705 coupled to a transceiver 765 (e.g., a transmitter and/or a receiver) and/or a network interface 775. The transceiver 765 is configured to transmit and receive signals for the communications device 700, such as the various signals as described herein, via an antenna 770. The network interface 775 is configured to obtain and send signals for the communications device 700 via communication link(s). The processing system 705 may be configured to perform processing functions for the communications device 700, including processing signals received and/or to be transmitted by the communications device 700.

The processing system 705 includes one or more processors 710. The one or more processors 710 are coupled to a computer-readable medium/memory 735 via a bus 760. In certain aspects, the computer-readable medium/memory 735 is configured to store instructions (e.g., computer-executable code) that when executed by the one or more processors 710, cause the one or more processors 710 to perform the operations 500 described with respect to FIG. 5, or any aspect related thereto. Note that reference to a processor of the communications device 700 performing a function may include the one or more processors 710 of the communications device 700 performing that function.

In the depicted example, the computer-readable medium/memory 735 stores code (e.g., executable instructions), such as code for communicating 740 (e.g., code for transmitting and/or receiving), code for deleting 745, and code for deactivating 750. Processing of the code for communicating 740 (e.g., code for transmitting and/or receiving), the code for deleting 745, and the code for deactivating 750 may cause the communications device 700 to perform the operations 500 described with respect to FIG. 5, or any aspect related thereto.

The one or more processors 710 include circuitry configured to implement (e.g., execute) the code stored in the computer-readable medium/memory 735, including circuitry such as circuitry for communicating 715, circuitry for deleting 720, and circuitry for deactivating 725. Processing with the circuitry for communicating 715, the circuitry for deleting 720, and the circuitry for deactivating 725 may cause the communications device 700 to perform the operations 500 described with respect to FIG. 5, or any aspect related thereto. Various components of the communications device 700 may provide means for performing the operations 500 described with respect to FIG. 5, or any aspect related thereto.

Example Aspects

In addition to the various aspects described above, specific combinations of aspects are within the scope of the disclosure, some of which are detailed below:

Aspect 1: A method for wireless communication, comprising: receiving, from a first user equipment (UE), a request to obtain a subscriber identity module (SIM) profile associated with a second UE, the first UE being different than the second UE; transmitting a first message including the SIM profile associated with the second UE in response to the request; and communicating with the first UE using the SIM profile.

Aspect 2: The method of Aspect 1, further comprising authenticating whether a user associated with the SIM profile has sent the request via the first UE, wherein the first message including the SIM profile is transmitted based on the authentication.

Aspect 3: The method of Aspect 2, wherein the authenticating includes: sending a first code to be displayed to the user; receiving a second code from the first UE after sending the first code; and determining whether the second code matches the first code.

Aspect 4: The method of Aspect 3, wherein the first code is sent to the user via email.

Aspect 5: The method according to any of Aspects 1-4, further comprising sending a second message configured to delete the SIM profile from the first UE after expiration of a timer.

Aspect 6: The method according to any of Aspects 1-5, further comprising determining whether the second UE is turned off in response to receiving the request, wherein the first message including the SIM profile is transmitted based on the second UE being turned off.

Aspect 7: The method of Aspect 6, further comprising: determining that the second UE has been turned back on; and transmitting a second message configured to delete the SIM profile from the first UE based on the second UE being turned back on.

Aspect 8: The method according to any of Aspects 1-7, wherein the SIM profile is associated with an embedded SIM (eSIM) of the second UE.

Aspect 9: A method for wireless communication, comprising: transmitting, from a first user equipment (UE) and to a network, a request to obtain a subscriber identity module (SIM) profile associated with a second UE, the first UE being different than the second UE; receiving a first message including the SIM profile associated with the second UE in response to transmitting the request; and communicating with the network using the SIM profile.

Aspect 10: The method of Aspect 9, further comprising receiving a phone number associated with the SIM profile, wherein the request is transmitted based on the phone number.

Aspect 11: The method of Aspect 9 or 10, further comprising: receiving an authentication code; and transmitting the authentication code to the network, wherein the first message including the SIM profile is received based on the authentication code.

Aspect 12: The method according to any of Aspects 9-11, further comprising deleting the SIM profile from the first UE after expiration of a timer.

Aspect 13: The method according to any of Aspects 9-12, further comprising: receiving a second message indicating to delete the SIM profile; and deleting the SIM profile in response to receiving the second message.

Aspect 14: The method according to any of Aspects 9-13, further comprising deactivating another SIM profile associated with the first UE prior to communicating using the SIM profile.

Aspect 15: The method according to any of Aspects 9-14, wherein the SIM profile is associated with an embedded SIM (eSIM) of the second UE.

Aspect 16: An apparatus for wireless communication, comprising: a memory; an one or more processors coupled to the memory and configured to: cause receiving, from a first user equipment (UE), a request to obtain a subscriber identity module (SIM) profile associated with a second UE, the first UE being different than the second UE; cause transmitting a first message including the SIM profile associated with the second UE in response to the request; and cause communicating with the first UE using the SIM profile.

Aspect 17: The apparatus of Aspect 16, wherein the one or more processors are further configured to authenticate whether a user associated with the SIM profile has sent the request via the first UE, wherein the first message including the SIM profile is caused to be transmitted based on the authentication.

Aspect 18: The apparatus of Aspect 17, wherein, to authenticate whether the user associated with the SIM profile has sent the request, the one or more processors are configured to: cause sending a first code to the user; cause receiving a second code from the first UE after sending the first code; and determine whether the second code matches the first code.

Aspect 19: The apparatus of Aspect 18, wherein the one or more processors are configured to cause sending the first code to the user via email.

Aspect 20: The apparatus according to any of Aspects 16-19, wherein the one or more processors are further configured to cause sending a second message configured to delete the SIM profile from the first UE after expiration of a timer.

Aspect 21: The apparatus according to any of Aspects 16-20, wherein the one or more processors are further configured to determine whether the second UE is turned off in response to receiving the request, wherein the first message including the SIM profile caused to be transmitted based on the second UE being turned off.

Aspect 22: The apparatus of Aspect 21, wherein the one or more processors are further configured to: determine that the second UE has been turned back on; and cause transmitting a second message configured to delete the SIM profile from the first UE based on the second UE being turned back on.

Aspect 23: The apparatus according to any of Aspects 16-22, wherein the SIM profile is associated with an embedded SIM (eSIM) of the second UE.

Aspect 24: An apparatus for wireless communication at a first user equipment (UE), comprising: a memory; an one or more processors coupled to the memory and configured to: cause transmitting, to a network, a request to obtain a subscriber identity module (SIM) profile associated with a second UE, the first UE being different than the second UE; cause receiving a first message including the SIM profile associated with the second UE in response to transmitting the request; and cause communicating with the network using the SIM profile.

Aspect 25: The apparatus of Aspect 24, wherein the one or more processors are further configured to cause receiving a phone number associated with the SIM profile, wherein the request caused to be transmitted based on the phone number.

Aspect 26: The apparatus of Aspect 24 or 25, wherein the one or more processors are further configured to: cause receiving an authentication code from a user; and cause transmitting the authentication code to the network, wherein the first message including the SIM profile is caused to be received based on the authentication code.

Aspect 27: The apparatus according to any of Aspects 24-26, wherein the one or more processors are further configured to delete the SIM profile from the first UE after expiration of a timer.

Aspect 28: The apparatus according to any of Aspects 24-27, wherein the one or more processors are further configured to: cause receiving a second message indicating to delete the SIM profile; and delete the SIM profile in response to receiving the second message.

Aspect 29: The apparatus according to any of Aspects 24-28, wherein the one or more processors are further configured to deactivate another SIM profile associated with the first UE prior to causing communicating using the SIM profile.

Aspect 30: The apparatus according to any of Aspects 24-29, wherein the SIM profile is associated with an embedded SIM (eSIM) of the second UE.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communication, comprising:
receiving, from a first user equipment (UE), a request to obtain a subscriber identity module (SIM) profile associated with a second UE, the first UE being different than the second UE;
transmitting a first message including the SIM profile associated with the second UE in response to the request and based on the second UE being turned off; and
communicating with the first UE using the SIM profile.

2. The method of claim 1, further comprising authenticating whether a user associated with the SIM profile has sent the request via the first UE, wherein the first message including the SIM profile is transmitted based on the authentication.

3. The method of claim 2, wherein the authenticating includes:
sending a first code to be displayed to the user;
receiving a second code from the first UE after sending the first code; and
determining whether the second code matches the first code.

4. The method of claim 3, wherein the first code is sent to the user via email.

5. The method of claim 1, further comprising sending a second message configured to delete the SIM profile from the first UE after expiration of a timer.

6. The method of claim 1, further comprising determining whether the second UE is turned off in response to receiving the request.

7. The method of claim 6, further comprising:
determining that the second UE has been turned back on; and
transmitting a second message configured to delete the SIM profile from the first UE based on the second UE being turned back on.

8. The method of claim 1, wherein the SIM profile is associated with an embedded SIM (eSIM) of the second UE.

9. A method for wireless communication, comprising:
transmitting, from a first user equipment (UE) and to a network, a request to obtain a subscriber identity module (SIM) profile associated with a second UE, the first UE being different than the second UE;
receiving a first message including the SIM profile associated with the second UE in response to transmitting the request and based on the second UE being turned off; and
communicating with the network using the SIM profile.

10. The method of claim 9, further comprising receiving a phone number associated with the SIM profile, wherein the request is transmitted based on the phone number.

11. The method of claim 9, further comprising:
receiving an authentication code; and
transmitting the authentication code to the network, wherein the first message including the SIM profile is received based on the authentication code.

12. The method of claim 9, further comprising deleting the SIM profile from the first UE after expiration of a timer.

13. The method of claim 9, further comprising:
receiving a second message indicating to delete the SIM profile; and
deleting the SIM profile in response to receiving the second message.

14. The method of claim 9, further comprising deactivating another SIM profile associated with the first UE prior to communicating using the SIM profile.

15. The method of claim 9, wherein the SIM profile is associated with an embedded SIM (eSIM) of the second UE.

16. An apparatus for wireless communication, comprising:

at least one memory; and one or more processors coupled to the at least one memory and configured to:

cause receiving, from a first user equipment (UE), a request to obtain a subscriber identity module (SIM) profile associated with a second UE, the first UE being different than the second UE;

cause transmitting a first message including the SIM profile associated with the second UE in response to the request and based on the second UE being turned off; and cause communicating with the first UE using the SIM profile.

17. The apparatus of claim 16, wherein the one or more processors are further configured to authenticate whether a user associated with the SIM profile has sent the request via the first UE, wherein the first message including the SIM profile is caused to be transmitted based on the authentication.

18. The apparatus of claim 17, wherein, to authenticate whether the user associated with the SIM profile has sent the request, the one or more processors are configured to:

cause sending a first code to the user;

cause receiving a second code from the first UE after sending the first code; and determine whether the second code matches the first code.

19. The apparatus of claim 18, wherein the one or more processors are configured to cause sending the first code to the user via email.

20. The apparatus of claim 16, wherein the one or more processors are further configured to cause sending a second message configured to delete the SIM profile from the first UE after expiration of a timer.

21. The apparatus of claim 16, wherein the one or more processors are further configured to determine whether the second UE is turned off in response to receiving the request.

22. The apparatus of claim 21, wherein the one or more processors are further configured to:

determine that the second UE has been turned back on; and cause transmitting a second message configured to delete the SIM profile from the first UE based on the second UE being turned back on.

23. The apparatus of claim 16, wherein the SIM profile is associated with an embedded SIM (eSIM) of the second UE.

24. An apparatus for wireless communication at a first user equipment (UE), comprising:

at least one memory; an one or more processors coupled to the at least one memory and configured to:

cause transmitting, to a network, a request to obtain a subscriber identity module (SIM) profile associated with a second UE, the first UE being different than the second UE;

cause receiving a first message including the SIM profile associated with the second UE in response to transmitting the request and based on the second UE being turned off; and cause communicating with the network using the SIM profile.

25. The apparatus of claim 24, wherein the one or more processors are further configured to cause receiving a phone number associated with the SIM profile, wherein the request caused to be transmitted based on the phone number.

26. The apparatus of claim 24, wherein the one or more processors are further configured to:

cause receiving an authentication code from a user; and cause transmitting the authentication code to the network, wherein the first message including the SIM profile is caused to be received based on the authentication code.

27. The apparatus of claim 24, wherein the one or more processors are further configured to delete the SIM profile from the first UE after expiration of a timer.

28. The apparatus of claim 24, wherein the one or more processors are further configured to:

cause receiving a second message indicating to delete the SIM profile; and delete the SIM profile in response to receiving the second message.

29. The apparatus of claim 24, wherein the one or more processors are further configured to deactivate another SIM profile associated with the first UE prior to causing communicating using the SIM profile.

30. The apparatus of claim 24, wherein the SIM profile is associated with an embedded SIM (eSIM) of the second UE.

* * * * *